United States Patent [19]

Hooks, Jr.

[11] Patent Number: 5,006,936
[45] Date of Patent: Apr. 9, 1991

[54] METHOD AND SYSTEM FOR HIGH DENSITY ANALOG DATA STORAGE RETRIEVAL, AND TRANSMISSION

[75] Inventor: John T. Hooks, Jr., Dallas, Tex.

[73] Assignee: LTV Aerospace and Defense Company, Grand Prairie, Tex.

[21] Appl. No.: 268,614

[22] Filed: Nov. 2, 1988

Related U.S. Application Data

[63] Continuation of Ser. No. 802,293, Nov. 27, 1985, abandoned, which is a continuation of Ser. No. 610,554, Aug. 13, 1984, abandoned.

[51] Int. Cl.$^5$ ............................................. H04N 5/76
[52] U.S. Cl. ...................................... 358/335; 360/8; 360/9.1
[58] Field of Search ............... 360/8, 9.1, 32, 37.1, 360/33.1; 387/29, 31, 34; 358/310, 334, 133, 138, 335

[56] References Cited

U.S. PATENT DOCUMENTS

| | | | |
|---|---|---|---|
| 3,071,643 | 1/1963 | Matthews | 358/143 |
| 3,789,137 | 1/1974 | Newell | 358/343 |
| 3,883,891 | 5/1975 | Thompson | 360/47 |
| 3,919,716 | 11/1975 | Yumde | 360/9.1 |
| 3,947,874 | 3/1976 | Lentz | 358/337 |
| 4,141,039 | 2/1979 | Yamamoto | 360/8 |
| 4,303,950 | 12/1981 | Taniguchi | 360/8 |
| 4,575,773 | 3/1986 | Dymond et al. | 358/335 |

*Primary Examiner*—Robert L. Richardson
*Attorney, Agent, or Firm*—Arnold, White & Durkee

[57] ABSTRACT

An encoder circuit utilizes a pair of digital memories clocked at a slower write than read rate to compact analog input data, blanking and synchronization pulse intervals, and generate NTSC video. The NTSC formatted data may be stored utilizing conventional NTSC tape or disc recording equipment or may be transmitted, duplicated, monitored or transcribed utilizing readily available NTSC video equipment. A decoder circuit is provided to reprocess the NTSC video formatted data and restore it to its original form by removing the synchronization and blanking intervals and, utilizing a pair of digital memories clocked at a faster write than read rate, re-stretch the data which was compacted in the time dimension by the encoder circuit.

15 Claims, 3 Drawing Sheets

METHOD AND SYSTEM FOR HIGH DENSITY ANALOG DATA STORAGE RETRIEVAL, AND TRANSMISSION

The Government has rights in this invention pursuant to Contract No.N00019-76-A-0368 awarded by the U.S. Navy.

BACKGROUND OF THE INVENTION

This application is a continuation of application Ser. No. 802,293, filed Nov. 27, 1985 (now abandoned), which was a continuation of application Ser. No. 610,554, filed Aug. 13, 1984 (now abandoned).

This invention relates to methods and systems for storage, retrieval and transmission of analog data and more particularly to such methods and systems which provide relatively high density data transmission and storage.

The availability of low cost video storage devices for the domestic television/entertainment industry provides an attractive bulk storage medium for certain types of information which may include, for example, very high resolution scene data or information. Typical low-cost video storage devices include video tape recorders (VTR) and laser disc recorders (LDR). The latter are especially attractive for the storage of data because they are capable of storing much more information in a small space, and hence at lower cost, than is possible with ordinary magnetic tape storage. The laser disc is also less subject to deterioration than is magnetic tape.

The format of standard television signals used for domestic television (NTSC), however, constrains the usage of conventional TV storage devices to uses in which the information to be stored is structured similarly to the structure of conventional NTSC video signals. This invention pertains to a method and system for compacting the analog data and inserting the synchronization/blanking intervals required for NTSC format before recording or transmission with later restoration of essentially the continuous analog information upon reproduction.

It is therefore an object of the present invention to provide an improved method and apparatus for storing and/or transmitting analog data.

It is another object of the invention to provide an improved method and system for compression and restoration of analog data.

A further object of the invention is to provide a method and system for converting analog data to NTSC video format for storage and/or transmission.

Still another object of the invention is to provide an improved method and system for restoring NTSC video formatted data to a continuous analog form.

Yet a further object of the invention is to provide a method and system which permits the unrestricted use of standard NTSC television equipment for transmitting, duplicating, monitoring and/or transcribing video information which is not in NTSC format without causing severe contamination of the reproduced signals and without unwanted artifacts.

BRIEF DESCRIPTION OF THE INVENTION

These and other objects are accomplished in accordance with the present invention in which an encoder circuit is provided to compact analog input data and generate NTSC video with blanking and synchronization pulse intervals. The NTSC formatted data may be stored utilizing conventional NTSC tape or disc recording equipment as discussed above, or may be transmitted, duplicated, monitored or transcribed utilizing readily available NTSC video equipment. A decoder circuit is provided to reprocess the NTSC video formatted data and restore it to its original form by removing the synchronization and blanking intervals and restretching the data which was compacted in the time dimension by the encoder circuit.

In one embodiment, the encoder circuit includes a sample and hold circuit which is clocked at a first rate. The analog output of the sample and hold circuit is converted to digital form by means of an analog-to-digital converter circuit, the series of digital outputs of which is alternately gated to and written into alternate ones of a pair of digital memory means at the first clock rate. While data is being written into one of the memory means, data is being read out of the other memory means of the pair at a second higher frequency clock rate and converted to an analog signal by a digital-to-analog converter circuit thereby compressing the analog data in time. An NTSC sync format generator inserts a sync/blanking signal into the compressed analog data to provide an NTSC video formatted signal. In a further embodiment of the encoder, a third memory means provides for redundant data storage so that exact switching instants for compacting the data and restoring the data are not critical.

The decoder circuit of the embodiment receives the NTSC video formatted signals and utilizes a sync clipper circuit, sync stripper circuit and write inhibit/interval generator circuit to remove the sync and blanking interval from the signal which is being sampled from the sync clipper circuit by a sample and hold circuit at the second fast clock rate. The magnitudes of the analog signal sampled by the sample and hold circuit are converted to digital form by means of an analog-to-digital converter circuit. The sequence of digital coded data from the analog-to-digital converter circuit is alternately gated to and written into alternate ones of a pair of memory means at the second clock rate. While digital data is being written into one of the memory means of the pair at the second fast clock rate, digital data is being read out of the other memory means of the pair at the first slower clock rate and converted by a digital-to-analog converter to an analog output signal equivalent to the original analog data signal before it was encoded by the encoder circuit.

In a further embodiment of the invention, the memory means, analog-to-digital converter circuit, digital-to-analog circuit, timing circuitry, etc., may be time shared by the encoder circuit and decoder circuit.

BRIEF DESCRIPTION OF THE DRAWINGS

The novel features believed characteristic of the invention are set forth in the appended claims. The invention itself, however, as well as other features and advantages thereof, will best be understood by reference to the detailed description which follows, when read in conjunction with the accompanying drawings, wherein:

DETAILED DESCRIPTION OF PREFERRED EMBODIMENTS

A previously stated objective of the present invention is to provide a method and system for the compression of analog data such as video scene data and the conversion of this compressed data into NTSC video format so that the compressed data ay be stored, processed, .transmitted, displayed, etc., utilizing readily available and relatively inexpensive NTSC video equipment and further, to provide a method and system for reconverting the NTSC video formatted data to its original continuous analog form. Domestic (USA) TV signal structure which utilizes the NTSC format designed for a 4:3 aspect (horizontal to vertical dimension) raster, with 2:1 interlace, and 525 horizontal scan lines per picture. Furthermore, this TV signal structure requires 2 fields (half of an interlaced frame) per frame at 30 frames per second.

Figure 1:
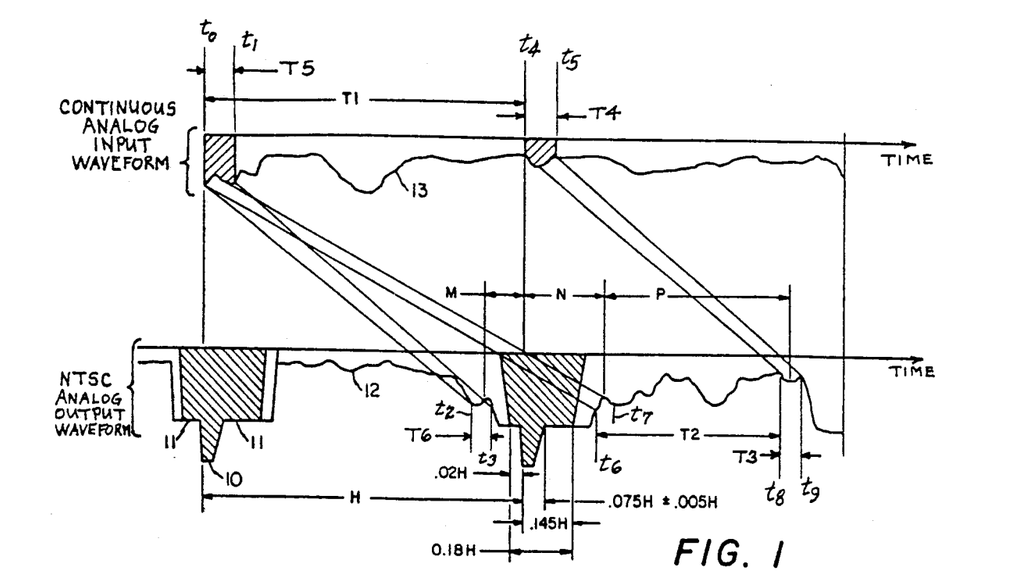
FIG. 1 is a graphic representation of analog information which is converted to NTSC video format during the encoding process.

Referring then to FIG. 1, synchronization pulses 10 for horizontal scan (SYNCH) are typically the most negative going portions of the waveforms and these serve to lock the playback (usually a TV receiver) so that a horizontal scan line starts on the leading edge of each horizontal synchronization line. The signal portions 11 on either side of the synchronization pulse are called blanking pulses and serve to cut off the display so that horizontal scans may fly-back (from the end of one line to the start of another) without being seen by the viewer.

The TV visual signal is the analog signal waveform 12 between successive blanking pulses. It should be clear from FIG. 1 that the normal functioning of a TV video system shares the time of a full line with pulses for blanking and synchronization, all of which is suitable to the transmission of intermittent series of (photo-graphically) visual images in which blanking forms a frame around the scene. Analog information which is flowing continuously such as that represented by the continuous waveform 13 would not normally fit into the intermittent structure of NTSC video without periodic loss of information which occurs at the time of occurrence of the synchronization and blanking portions of the NTSC composite video signal. In accordance with the present invention, a method and system is provided for compaction of the data occurring during the interval t1 into a time period t2 before recording with later restoration of essentially the continuous analog video information upon reproduction.

Figure 2:
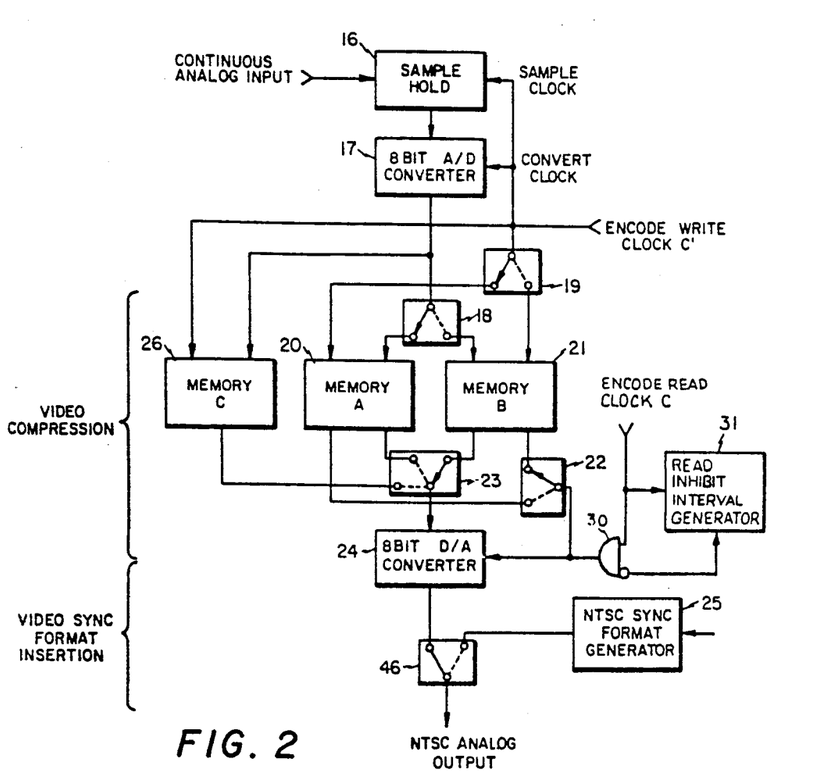
FIG. 2 is a block diagram of the encoder circuit comprising an embodiment of the invention.
Figures 3, 4, 6:
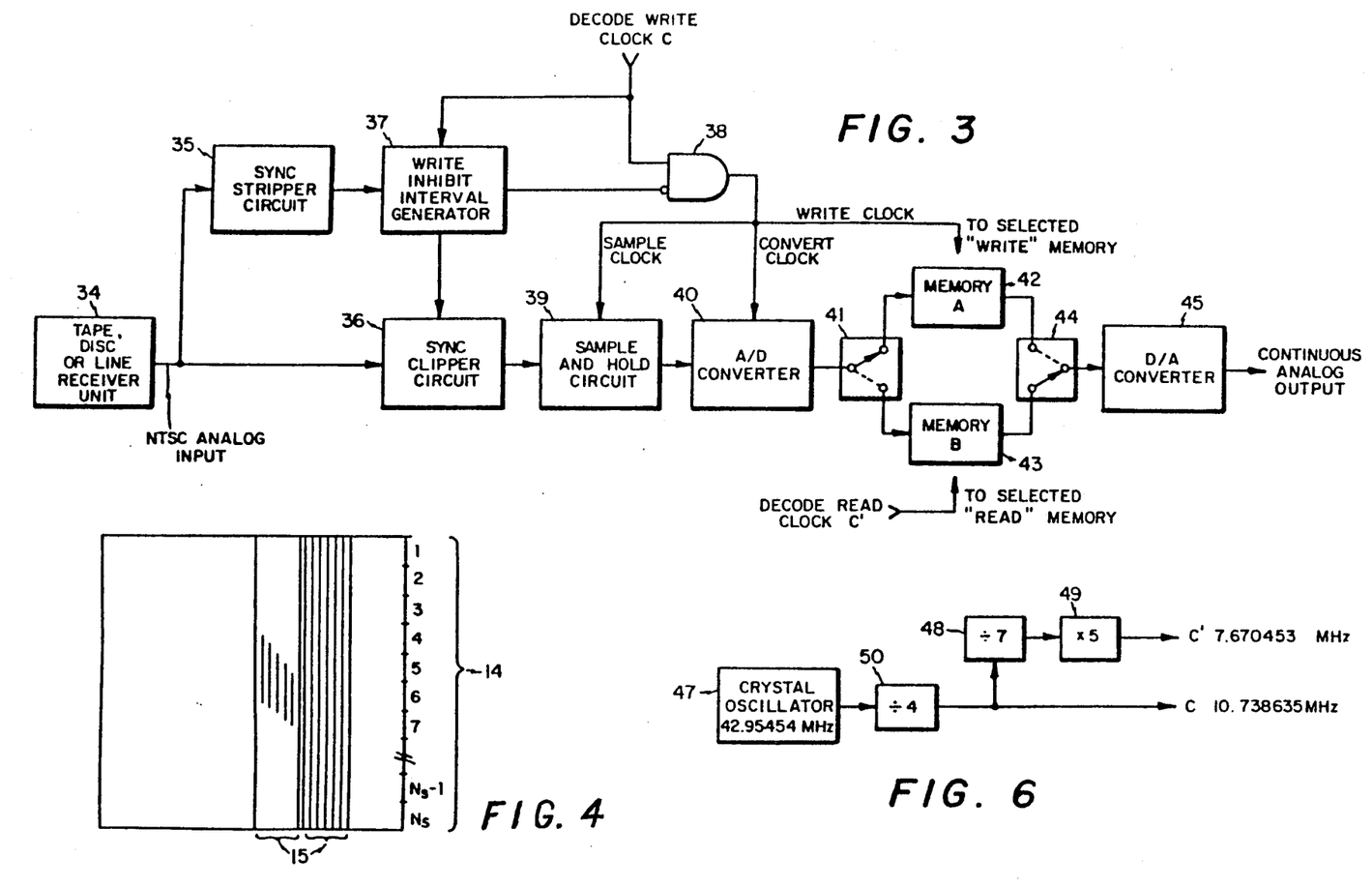
FIG. 3 is a block diagram of the decoder circuit comprising an embodiment of the invention.
FIG. 4 is a graphic representation of the continuous analog waveform scene information in relation to NTSC video information.
FIG. 6 is a block diagram of the clock circuit utilized to operate the encoder and decoder circuits of FIGS. 2 and 3, respectively.

The encoder circuitry of FIG. 2 serves to compact the data for recording or processing in NTSC video format while the decoder circuitry of FIG. 3 serves to reprocess the data following playback of the recorded NTSC video. The information is compacted before recording, recorded as conventional TV NTSC video, blanking and synchronization pulse intervals added. The information is restored to its original continuous analog form on playback with the synchronizatio/- blanking intervals removed and the data, which was previously compacted, restretched in the time dimension.

Referring for a moment to FIG. 4, the continuous analog data may be a scene in which each continuous scan line 14 is composed of a number, Ns of conventional (525 line) horizontal scan lines. An integral member of these "super" long scan lines may comprise a single frame of conventionally scanned NTSC video but are only a stripe or zone 15 of the total scene of FIG. 4. In fact, the information from several frames of NTSC video are required to give one frame of information in accordance with the packing plan of FIG. 4. Thus, the system of the present invention which comprises readily available and relatively inexpensive equipment normally used for standard TV signals, may be used to handle the video information of a much larger scene composed of a greater number of scan lines and with a much greater resolution of detail than otherwise would be attainable with standard 525 line video. A longer period of time is needed to transmit a full scene of the finer resolution video since the usual TV frames are being used to convey the information of only a portion of the full scene. However, the present invention premits unrestricted use of standard TV equipment for transmitting, duplicating, monitoring or transcribing information of this higher resolution without causing undesirable contamination of the reproduced video and without causing unwanted artifacts.

Referring now to FIG. 2, the information input to the encoder circuit is a continuous analog waveform representative, for example, of the total scene information described above with respect to FIG. 4. Such information is provided, for example, by a continuous scanner of a larger scale than for a single NTSC-525 scene in terms of its total number of picture elements. It should be recognized that the analog data input is not restricted to this particular larger scale pictorial format but can be any continuous waveform of relatively high frequency information content.

The input data is sampled periodically by sample and hold circuit 16 at a first clock rate provided by clocking signal C'. A conventional high speed analog to digital converter 17, receives each sampled magnitude and generates a sequence of digitally coded outputs which are, for example, 8-bit digital words, each representative of a sampled magnitude. The input data as discussed above may be a video signal in the form of video information but without the usual horizontal synchronization and blanking pulses. The sample rate may be on the order of 2–4 times the color subcarrier at this point. It is typical within the TV industry to convert analog TV signals to digital format using samples at 3 or 4 times the subcarrier frequency or of 3.58 MHz. Well known sampling theory requires the frequency of samples to be at least 2 times the highest frequency components of the information stream (input) and while 2 times is the absolute lowest rate for faithful reproduction, several practicable issues usually encourage the use of higher speed sampling In this embodiment, the sampling rate of Clock C' is 7.67045371 MHz.

The digital samples of each sampling interval are gated by means of selector circuit 18 to either memory A 20 or memory B 21 with one or the other being used for writing data at all times. Memories 20 and 21 which are, for example, 8-bit by 512 word memories, are alternately written and read, with one receiving information, i.e., in the write mode, as controlled by write clock signals from selector circuit 19, while the other is supplying digital information, i.e., in the read mode as controlled by read clock signals from selector circuit 22. Each is timed so that the time span of WRITE corresponds to a single line of NTSC-525 line video format.

The operation of the encoder circuit of FIG. 2 is best explained with reference to FIG. 5 which shows a continuous video waveform with sharing by alternate intervals of writing and encoding memories A and B. Significantly, this causes a single time delay equal to a line in which it may be noted that the video waveform of the WRITE-A interval is displaced by one line interval, etc. as may be seen in FIG. 5.

Figure 5:
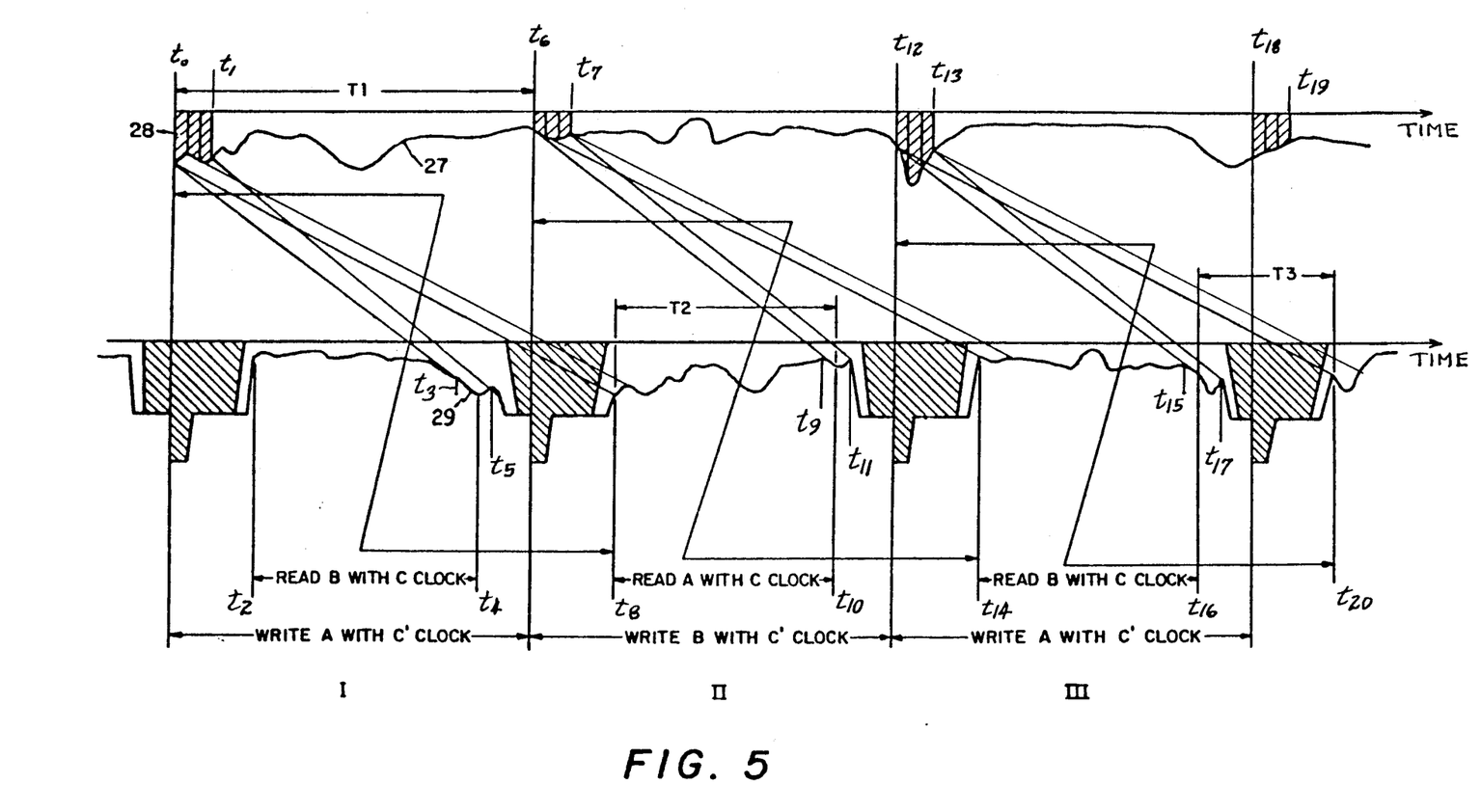
FIG. 5 is a graphic representation of analog information which is converted to NTSC video format during the encoding process and returned to its original continuous analog format during the decoding processes.

In the present embodiment, an additional digital memory C, shown as functional block 26 in FIG. 2, also receives digitalized information, particularly at the start of each WRITE interval as shown by the shaded region 28 of continuous analog waveform 27 of FIG. 5. Memory C 26 comprises, for example, an 8-bit by 48 word memory. The information stored in memory C is redundant in that it represents information which is also in memory A or B, organized so as to duplicate each first sequence of input data in either of these memories.

The information is compressed, in the time dimension, by reading the data alternately from memories 20 and 21 in the same sample order as the samples were written into the memories, but at a faster rate provided by clock C via selector circuit 22. Thus, data which has been sampled and digitized, and stored at approximately 3 times the color burst ate, spanning the time of a full NTSC-525 horizontal line is read out from the memories at a higher rate (3 × color subcarrier or 10.738635 MHz) provided by clock C so that it now occupies a period of time which is less than a single TV line. The net compression in this particular hardware is then 7 to 5. With respect to the waveforms and timing intervals of FIG. 5, data in "real-time" which spans an interval, t1, now spans lesser interval t2. This allows the introduction of the necessary blanking/synchronization pulses which, along with the redundant data 29 from memory C 26, occupy the time interval t3.

The inhibit interval is provided by inhibit/interval generator 31 which is comprised of a counter circuit which counts clock pulses from the fast C clock and generates an inhibit signal to gate 30 starting after every n th clock pulse and lasting in duration for a predetermined number of clock pulses. Referring back to FIG. 1, the dimensions of the sync and blanking intervals are noted in terms of the time for each total horizontal scan line H. Since Clock C is a fixed frequency, namely 10.738635 MHz, the time for each horizontal scan line as well as the time for blanking, sync and overlapping data may also be expressed in terms of Clock C. Thus, in the present embodiment, H=227.5 C by inhibiting the C clock to the memories and to digital-to-analog converter 24. The blanking portion which precedes the leading edge of the sync pulse to the nominal center of the overlap data (leading sync), M=19 C. The blanking portion which lags the leading edge of the sync pulse to the nominal center-of-overlap data (lagging sync), N=46 C. The horizontal gap time of the inhibit/interval signal provided by circuit 30 is thus M+N=65 C. This is the time interval which is inserted into the incoming video stream when formatting into NTSC 525 by inhibiting the C clock to the memories and to digital-to-analog converter 24. Consider the time interval I in FIG. 5. Memory B is being read while memory A is being written with incoming sample information provided in digital form by analog-to-digital converter 17. Memory C is also being WRITTEN with information corresponding to the start of the information stream into Memory A. In time interval II, Memory A 20 is being READ with its samples representing the analog video of the preceding time interval. At the start of the READ cycle period of Memory A in time interval II, Memory C 26 has been loaded with data from the start of the WRITE interval of Memory B in time interval II. This data is outputted, i.e., READ in the interval II as at the conclusion of reading of the data from Memory A. This gives a redundant segment of data which is later duplicated as Memory B is read in time interval III. The time lost to blanking and synchronization is shown as the shaded regions on the waveform of FIG. 5. In practicable realizations of the circuitry, with functional elements of FIG. 2, it can be reasonably expected that timing will not be exactly stable and some time uncertainty of the occurrence of the blanking and synchronization intervals relative to the periodic and alternate stream of digital data samples will occur.

The output data stream of multiplexer 23 is a concatinated stream of data which might be summarized as BC/AC/BC/AC/, etc., in which the / denotes the switching of the data stream from Memory C to that from Memory A or B as next in sequence. One of the features of this invention is that the time allocated to the transfer of data and the time interval to allow the insertion of the synchronization/blanking interval pulse interval, is uncritical as to exactly when it occurs, provided of course it occurs before the end of the data stream from C and after the start of the data stream of the succeeding memory A or B, of the next time interval.

The projection lines from the waveform representations of FIG. 5 relate data instants from the continuous analog input data stream 27 to corresponding points on the NTSC video formatted output data stream, below it.

Referring back now to FIG. 2, the now intermittent data stream from the digital memories 20, 21 and 26 AC/BC/AC . . . read with the fast clock C and provided at the output of multiplexer circuit 23, is converted to analog form by means of digital to analog converter circuit 24 and the encoding operations are completed with the addition by multiplexer 46 of the NTSC synchronization and blanking pulses provided by a conventional NTSC sync format generator 25. At this point the signal looks like a conventional analog NTSC-525 line TV signal. A larger field of information, not normally suited to 525 line format, has been converted to the point that conventional NTSC TV apparatus can be employed for recording, storing, switching and communication of the data. Of course, a 525 raster scan display could be used to view the data, but would give a senseless presentation of the data on a conventional TV monitor since the various features of the input data are not so organized as to be meaningfully displayed by a single TV raster scan.

The preceding discussed the encoding of the information with a compaction of the time interval so as to allow a 2/7 duration outage for the purpose of insertion of the NTSC blanking and synchronization pulses. Decoding the analog signal generated by the encoder circuit of FIG. 2 is essentially a reversal of the process as may be seen with reference to FIG. 3.

The signal at the input to the decoder circuit of FIG. 3 has the appearance of a standard NTSC TV video signal somewhat as shown and discussed with respect to the result and waveform in FIG. 5, complete with synchronization and blanking pulses separated by a longer span of time corresponding to a single horizontal TV scan line. The NTSC video signal from a tape, disc or line receiver 34 is applied to sync stripper circuit 35 and sync clipper circuit 36. As in conventional NTSC video the synchronization pulse is the lowest amplitude portion of the signal which makes it identifiable by voltage sensitive threshold circuits as utilized in domestic TV receivers. Sync stripper circuit 35 identifies the synchronization pulse and provides a series of sync pulses without the data to Write Inhibit/Interval generation circuit 37.

Write Inhibit/Internal generation circuit 37 is comprised of resettable digital counters operated by Clock C. The counter begins counting when it receives the sync pulse signal from sync stripper circuit 35 and counts until occurrence of the next sync pulse. A predetermined count interval of clock pulses determinative of the total blanking interval on either side of the sync pulse signal, including a sufficient interval to remove the overlapping data provided by memory C of the encoder circuit as was shown in FIG. 5 is output as the interval during which the write clock is inhibited.

As previously discussed with respect to FIG. 1, the blanking portion which precedes the leading edge of the sync pulse to the nominal center of the overlap data (leading sync) M plus the blanking portion which lags the leading edge of the sync pulse to the nominal center-of-overlap data (lagging sync) N is the time interval which was inserted into the incoming video stream when formatting into NTSC 525 by the encoder circuit of FIG. 2 and which is removed when recovering the continuous analog by means of the encoder circuit of FIG. 3. The time from the first valid video data in the interval to the last valid video data in the interval is thus P=162.5 C. By counting (N+162.5) C=208.5 C from the leading edge of the sync pulse is the beginning of the horizontal gap time of the inhibit/interval signal provided by circuit 37, which lasts for M+N=65 C.

The inhibit/interval signal provided by circuit 37 is inverted and applied to And-gate 38 along with clock C. The output of gate 38 therefore is essentially clock C but inhibited during the occurrence of the blanking-/sync and overlap data interval.

The inhibit/interval signal is also provided to sync clipper circuit 36 which removes the sync blanking and overlap data from the input NTSC format signal and passes only that portion of the analog signal which represents the desired information. The output of clipper circuit 36 is sampled by sample and hold circuit 39 at the fast clock C rate provided as "sample clock" via gate 38 and converted to a sequence of digital codes indicative of the magnitudes of each sample by means of analog-to-digital converter 40. The sequence of 8-bit digital code from converter 40 is gated by means of selector 41 alternately to memories A and B represented as blocks 42 and 43 in FIG. 3. The two memories, Memory A 42 and Memory B 43, are used in a manner similarly to the use of memories in the encoder of FIG. 2. Here, however, the operation is to write into Memory A with clock rate C (fast) while Memory B is being read out with clock rate C' (slow). The memories are employed alternately giving the effect of an average data flow input to the memory pair at the input of selector 41 equal to the continuous data flow output from the memory pair at the output of multiplexer 44.

It should be apparent that the conversion clock C as used for sampling and digital conversion which is output from gate 38 is faster than the C' clock used for reading the memory banks but that each has the same average number of pulses per horizontal line interval. This is because the C clock provided by gate 38 is actually intermittent, having been off-gated by the inhibit pulse which is generated for the span of the synchronization and blanking intervals as discussed above.

The Clock Generator utilized in the present embodiment to provide clock signals C and C' is illustrated in FIG. 6. Referring then to FIG. 6, a crystal oscillator 47 generates a frequency of 42.95454 MHz. This frequency is divided by 4 in divider/counter 50 to provide C=10.738635 MHz. C is divided by 7 in divider/counter 48 and multiplied by 5 in multiplexer/counter 49 to provide C'=7.670453 MHz.

It is a particular feature of this invention, as will be apparent to those familiar with the art of handling TV signals, that precise timing of the intermittent clock, to sample and convert the analog information is not a critical aspect of the present design. By use of redundancy, a data handling process has been supplied which is immune to sizeable timing errors.

Should the net off-gated time, caused by timing errors at the encoder, recorder, and/or decoder, be towards later time such as significantly into timing interval II of FIG. 5, some data will be cut off from the read of Memory A. But; the same time redundant information would have been provided from data initially read from Memory C of the encoder and decoded in the previous interval.

The normal timing is to always lose some data at the head of each interval following the synchronization/blanking interval and to always use a portion of the redundant information which has been pre-loaded at the tail of the preceding interval. Displacements from this "normal" timing have no effect on the information flow provided that the tail end of data during one interval is not extended past its end nor that the gating at the head end of the data in the succeeding interval is not so early as to completely miss the start of valid data in a given scan interval. This is accomplished by the counting process described above.

The digital data at the output of multiplexer 44 is then reconverted to analog form by means of digital-to-analog converter 45 to provide a recovered continuous analog signal essentially identical to the signal input to the encoder circuit of FIG. 2.

Although the embodiments described above were oriented to the NTSC television standard, it should be noted that the method and system of the present invention are equally applicable to PAL, SECAM, or any other similar television formatting standard.

Various embodiments of the invention have now been described in detail. Since it is obvious that many changes and modifications can be made in the above described details without departing from the nature and spirit of the invention, it is understood that the invention is not to be limited to said details except as set forth in the appended claims.

What is claimed is:

1. A bulk analog data storage system comprising:
  (a) first means for receiving a continuous analog video input signal;
  (b) first sample and hold means coupled to said receiving means for sampling said input data at a first clock rate;

(c) first analog-to-digital converter means for converting each of said samples to a digital code;
(d) first and second digital memory means;
(e) first gating means coupled to said first and second memory means for alternately providing digital coded samples of said input data to said first and second memory means;
(f) first clock means coupled to said first sample and hold means and to said first and second memory means for clocking said memory means at said first clock rate when data is being written into said memory means;
(g) second gating means coupled to said first and second memory means for multiplexing the digital coded samples of said input data as such data is alternately read from said memory means;
(h) second clocking means for clocking said first and second memory at a second clock rate which is of a higher frequency than said first clock rate;
(i) first digital-to-analog converter means for converting the digital coded samples as they are read from said second gating means into an analog formatted signal;
(j) first interval generator means for generating intervals of duration of a sync/blanking pulse for a selected video format, said intervals being at a repetition rate much lower than said first and second clock rates;
(k) third gating means coupled to said first interval generator and to said second clocking means for inhibiting said second clocking signal to the memory means selected by said second gating means during the generated interval, said inhibiting being for a limited period of time so that the inhibiting of the second clocking signal does not result in overwriting of data in said memory means before said data is read from a memory means;
(l) a sync/blanking format generator for generating sync/blanking pulses for said selected video format;
(m) fourth gating means coupled to said first digital-to-analog converter means and to said sync/blanking format generator for multiplexing the analog formatted signal and the sync/blanking interval into a video signal of said selected video format; and
(n) recorder means for recording said video signals in said selected video format.

2. The bulk storage system according to claim 1 including:
(a) second means coupled to said recorder means for receiving said video signals in said selected video format from said recorder means during playback thereof;
(b) sync stripper means coupled to said second means for detecting the leading edge of sync pulses from said video signals and generating a pulse signal indicative thereof;
(c) said interval generator means responsive to said pulse signal for generating intervals of duration of the sync/blanking pulse for said selected video format, said second interval generator means being responsive to said sync stripper means for establishing the placement in time of each generated interval;
(d) fifth gating means coupled to said second interval generator means and to said second clocking means for inhibiting said second clocking signal during said sync/blanking pulse interval generated by said second interval generator means to generate an interval clock signal;
(e) sync clipper means coupled to said second means and responsive to said interval clock signal for removing said sync/blanking signal from said video signals in said selected video format;
(f) sample and hold means coupled to said sync clipper means and responsive to said interval clock signal for sampling said video signal at said second clock rate;
(g) second analog-to-digital converter means for converting each said samples from said second sample and hold means o a digital code;
(h) third and fourth digital memory means;
(i) sixth gating means coupled to said second analog-to-digital converter means for alternately providing digital coded samples therefrom to said first and second memory means;
(j) means coupling said fifth gating means to each of said third and fourth memory means for writing the digital coded samples provided by said sixth gating means into the selected of said third and fourth means at said second clock rate except during the intervals provided by said second interval generator means;
(k) means coupling said first clocking means to said third and fourth memory means for reading digital coded sample data out of said third and fourth memory means at said first clock rate;
(l) seventh gating means coupled to said third and fourth memory means for receiving the digital coded sample data read out of said third and fourth memory means and multiplexing such data in alternating fashion;
(m) digital-to-analog converter means for converting said multiplexed data from said seventh gating means into a continuous analog signal.

3. A bulk analog data storage system comprising:
(a) first receiving means for receiving a continuous analog input signal;
(b) first sample and hold means coupled t said first receiving means for sampling said input data at a first clock rate;
(c) first clocking means coupled to said first sample and hold means for clocking said sample and hold means to sample said input data at a first clock rate;
(d) first analog-to-digital converter means for converting each of said samples to a digital code;
(e) first and second digital memory means;
(f) first gating means coupled to said first and second memory means for alternately providing digital coded samples of said input data to said first and second memory means, said first and second memory means being coupled to said first clocking means and being clocked at said first clock rate when data is being written into said first and second memory means;
(g) second gating means coupled to said first and second memory means for multiplexing the digital coded samples of said input data as such data is alternately read from said memory means;
(h) second clocking means for generating a second clocking signal at a second clock rate which is of a higher frequency than said first clock rate for clocking said first and second memory at a second clock rate;

(i) third gating means coupling said second clocking means to said first and second memory means for alternately providing said clocking signal to said first and second memory means when data is being read from said first and second memory means;

(j) first digital-to-analog converter means for converting the digital coded samples as they are read from said second gating means into an analog formatted signal;

(k) first interval generator means for generating intervals at least having a duration of a sync/blanking pulse for a selected video format, the repetition rate of said intervals being much less than said first and second clock rates;

(l) fourth gating means coupled to said first interval generator and to said second clocking means for inhibiting said second clocking signal provided via said third gating means to said first and second memory means selected by said second and third gating means during the generated interval, the time period of said inhibiting being such that an interval of inhibiting ends before data is overwritten in said first or second memory means before being read out of said first or second memory means;

(m) a sync/blanking format generator for generating sync/blanking pulses for said selected video format;

(n) fifth gating means coupled to said first digital-to-analog converter means and to said sync/blanking format generator for multiplexing said analog formatted signal and the sync/blanking pulses into a video signal of said selected video format; and (o) recorder means for recording said video signals in said selected video format.

4. The bulk storage system according to claim 1 including:

(a) second receiving means coupled to said recorder means for receiving said video signals in said selected video format during playback of said recorder means;

(b) sync stripper means coupled to said second means for detecting the leading edge of sync pulses from said video signals and generating a timing pulse signal indicative thereof;

(c) second interval generator means responsive to said timing pulse signal for generating respective intervals at least of the duration of the sync/blanking pulse for said selected video format, said second interval generator means being responsive to said sync timing pulse signal for establishing the placement in time of each such generated interval;

(d) sixth gating means coupled to said second interval generator means and to said second clocking means for inhibiting said second clocking signal during said interval generated by said second interval generator means to provide an intermittent clock signal of said second clock frequency;

(e) sync clipper means coupled to said second means and responsive to said intermittent clock signal for removing said sync/blanking pulse from said video signals in said selected video format;

(f) second sample and hold means coupled to said sync clipper means and responsive to said intermittent clock signal for sampling said video signal at said second clock rate;

(g) second analog-to-digital converter means for converting each of said samples from said second sample and hold means to a digital code;

(h) third and fourth digital memory means;

(i) seventh gating means coupled to said second analog-to-digital converter means for alternately providing digital coded samples therefrom to said first and second memory means;

(j) third means coupling said sixth gating means to each said third and fourth memory means for writing the digital coded samples provided by said seventh gating means into the selected of said third and fourth memory means at said second clock rate except during the intervals provided by said second interval generator means;

(k) fourth means coupling said first clocking means to said third and fourth memory means for selectively reading digital coded sample data out of said third and fourth memory means at said first clock rate;

(l) eighth gating means coupled to said third and fourth memory means for receiving the digital coded sample data read out of said third and fourth memory means and multiplexing such data in alternating fashion;

(m) digital-to-analog converter means for converting said multiplexed data from said eighth gating means into a continuous analog signal.

5. A method of retrieving a continuous analog data signal from a broadcast television format signal having a plurality of synchronization pulses disposed between adjacent segments of analog data signal, each segment of analog data signal having an initial redundant portion identical to a final portion of the previous segment, comprising the steps of:

creating gaps between adjacent segments of analog data signal by deleting each of said synchronization pulses and a first fixed portion of said broadcast television standard format signal prior to each of said synchronization pulses and a second fixed portion of said broadcast television standard format signal after each of said synchronization pulses wherein timing variations of said synchronization pulses will result in the deletion of a redundant portion of said analog data signal;

sampling said segments of analog data signal at a first clock rate;

alternately storing said sampled segments of analog data signal in at least two storage devices at said first clock rate; and alternately retrieving said sampled analog data signal from said at least two storage devices at a second clock rate which is of a lower frequency than said first clock rate whereby said gaps created by said deletion are eliminated by the expansion of said segments of analog data signal into a continuous analog data signal.

6. A method for retrieving a continuous analog signal from a broadcast television format signal according to claim 5, further including the steps of converting each of said samples of said segments of analog data signal to a digital code prior to storing said sampled analog data signal at said first clock rate.

7. A method for storing and retrieving continuous analog electrical data signals with conventional NTSC video equipment, comprising the steps of:

(a) storing the data signals, including the steps of:
(i) converting segments of the continuous analog electrical data signals to shorter segments of NTSC video format compatible analog video having intervals between said shorter segments for inserting horizontal synchronization and blanking pulses; said segments being condensed in time span by said step of converting to produce said shorter segments;

(ii) adding NTSC video horizontal synchronization and blanking pulses to the NTSC video format compatible analog video in said intervals without significant overwriting or deleting of video corresponding to said continuous analog electrical data signals, to generate NTSC video formatted data; and (iii) storing the NTSC video formatted data with conventional NTSC video equipment; and (b) retrieving the data, including the steps of:

(i) retrieving the NTSC video formatted data;

(ii) removing the NTSC video synchronization and blanking pulses from the NTSC video formatted data; and (iii) converting said shorter segments of NTSC video formatted data having said intervals into continuous electrical data signals having no said intervals.

8. A method for storing continuous analog electrical data signals with conventional NTSC video equipment, comprising the steps of:

(a) converting segments of the continuous analog electrical data signals to shorter segments of NTSC video format compatible analog video having intervals between said shorter segments for insertion of horizontal synchronization and blanking pulses; said segments being condensed in time span by said step of converting to produce said shorter segments;

(b) adding NTSC video horizontal synchronization and blanking pulses to the NTSC video format compatible analog video in said intervals without substantial deleting of said continuous analog electrical data signals in time periods adjacent said intervals, to generate NTSC video formatted data; and (c) storing the NTSC video formatted data with conventional NTSC video equipment.

9. A method for retrieving and restoring from memory storage NTSC video formatted data containing compressed continuous analog electrical data signals and NTSC video synchronization and blanking pulses, with conventional NTSC video equipment, comprising the steps of:

(a) retrieving the NTSC video formatted data from memory storage;

(b) removing said NTSC video synchronization and blanking pulses from intervals in the NTSC video formatted data; and (c) converting the NTSC video formatted data into continuous analog electrical data signals by deleting said intervals without deleting significant portions of video data signals adjacent the intervals and expanding the remaining NTSC video formatted data in time span to restore said continuous analog electrical data signals.

10. A method for transmitting and receiving continuous analog electrical data signals using conventional NTSC video equipment, comprising the steps of:

(a) transmitting the data signals, including the steps of:

(i) converting segments of the continuous analog electrical data signals to shorter segments of NTSC video format compatible analog video signals including intervals between said shorter segments for inserting horizontal synchronization and blanking pulses; said segments being condensed in time span by said step of converting to produce said shorter segments;

(ii) adding NTSC video horizontal synchronization and blanking pulses to the NTSC video format compatible analog video signals in said intervals without deleting significant parts of said analog video corresponding to said analog electrical data signals in time periods adjacent said intervals to generate NTSC video formatted data; and (iii) transmitting the NTSC video formatted data; and (b) receiving and restoring the data signals, including the steps of:

(i) receiving the NTSC video formatted data;

(ii) removing the NTSC video synchronization and blanking pulses from the NTSC video formatted data at said intervals; and (iii) converting said shorter segments of the NTSC video formatted data into said segments of continuous electrical data signals by expanding said shorter segments in time and removing said intervals without deleting significant parts of said analog electrical data signals.

11. A method for transmitting continuous analog electrical data signals using conventional NTSC video equipment, comprising the steps of:

(a) converting segments of the continuous analog electrical data signals to shorter segments of NTSC video format compatible analog video signals including intervals between said shorter segments for insertion of horizontal synchronization and blanking pulses, without deleting or omitting substantial parts of said continuous analog electrical data signals adjacent said intervals; said segments being condensed in time span by said step of converting to produce said shorter segments;

(b) adding horizontal synchronization and blanking pulses to the NTSC video format compatible analog video in said intervals to generate NTSC video formatted data; and (c) transmitting the NTSC video formatted data.

12. A method for receiving and restoring continuous analog electrical data signals from video signals formatted as NTSC video formatted data using conventional NTSC video equipment, comprising the steps of:

(a) receiving the video signals as NTSC video formatted data;

(b) removing the NTSC video synchronization and blanking pulses from the NTSC video formatted data to leave spaced segments of compressed-in-time video; and (c) converting said spaced segments of NTSC video formatted data into continuous electrical data signal format by removing intervals where the synchronization and blanking pulses were removed and expanding said spaced segments in time, thereby restoring original continuous analog electrical data signals without deletions in time periods including or adjacent said intervals.

13. A method of converting a given amount of continuous analog data to NTSC video formatted data, comprising the steps of:
(a) sampling the continuous analog data at a first clock rate to generate sampled magnitudes;
(b) converting the sampled magnitudes to digital samples at the first clock rate;
(c) writing the digital samples into a first digital memory at the first clock rate;
(d) reading the digital samples from the first digital memory at a second clock rate which is faster than the first clock rate;
(e) writing subsequent digital samples into a second digital memory at the first clock rate, wherein the writing of the subsequent digital samples occurs during the reading of the digital samples from the first digital memory;
(f) reading the subsequent digital samples form the second digital memory at the second clock rate;
(g) writing next subsequent digital samples into the first digital memory at the first clock rate, wherein the writing of the next subsequent digital samples occurs during the reading of the subsequent digital samples from the second digital memory;
(h) reading the next subsequent digital samples from the first digital memory at the second clock rate;
(i) interrupting the reading of the digital memories for predetermined time intervals corresponding to the time duration of NTSC video format synchronization and blanking pulses;
(j) converting the digital samples read from the digital memories at the second clock rate to analog video;
(k) inserting NTSC video format synchronization and blanking pulses during the predetermined time intervals to generate NTSC video formatted data; and
(l) repeating steps (a) through (k) for all the given amount of continuous analog data.

14. A method of converting a given amount of continuous analog data to NTSC video formatted data as recited in claim 13 further comprising the steps of:
(a) writing digital samples of a first sequence of input data into a third digital memory at the first clock rate, wherein the writing of the digital samples of the first sequence of input data occurs during the start of writing the digital samples into the first digital memory;
(b) reading the digital samples of the first sequence of input data from the third digital memory at the second clock rate, wherein the reading of the digital samples of the first sequence of input data occurs at the end of reading previous digital samples from the second memory;
(c) writing subsequent digital samples of a first sequence of subsequent input data into the third digital memory at the first clock rate, wherein the writing of the subsequent digital samples of the first sequence of subsequent input data occurs during the start of writing the subsequent digital samples into the second digital memory;
(d) reading the subsequent digital samples of the first sequence of the subsequent input data from the third digital memory at the second clock rate, wherein the reading of the subsequent digital samples of the first sequence of subsequent input data occurs at the end of reading the digital samples from the first memory;
(e) writing next subsequent digital samples of a first sequence of next subsequent input data into the third digital memory at the first clock rate, wherein the writing of the next subsequent digital samples of the first sequence of next subsequent input data occurs during the start of writing the next subsequent digital samples into the first digital memory;
(f) reading the next subsequent digital samples of the first sequence of the next subsequent input data from the third digital memory at the second clock rate, wherein the reading of the next subsequent digital samples of the first sequence of next subsequent input data occurs at the end of reading the subsequent digital samples from the first memory; and
(g) repeating steps (a) through (f) for all the given amount of continuous analog data.

15. A method of converting a given amount of NTSC video formatted data to continuous analog data, comprising the steps of:
(a) stripping NTSC synchronization and blanking pulses from the NTSC video formatted data;
(b) sampling the NTSC video formatted data at a first clock rate to generate sampled magnitudes;
(c) converting the sampled magnitudes to digital samples at the first clock rate;
(d) writing the digital samples into a first digital memory at the first clock rate;
(e) reading the digital samples from the first digital memory at a second clock rate which is slower than the first clock rate;
(f) writing subsequent digital samples into a second digital memory at the first clock rate, wherein the writing of the subsequent digital samples occurs during the reading of the digital samples from the first digital memory;
(g) reading the subsequent digital samples from the second digital memory at the second clock rate;
(h) writing next subsequent digital samples into the first digital memory at the first clock rate, wherein the writing of the next subsequent digital samples occurs during the reading of the subsequent digital samples from the second digital memory;
(i) interrupting the writing of the digital memories for predetermined time intervals corresponding to the time duration of the NTSC synchronization and blanking pulses;
(j) converting the digital samples read from the digital memories at the second clock rate to continuous analog data; and
(k) repeating steps (a) through (j) for all the given amount of NTSC video formatted data.

* * * * *

UNITED STATES PATENT AND TRADEMARK OFFICE
CERTIFICATE OF CORRECTION

PATENT NO. : 5,006,936
DATED : April 9, 1991
INVENTOR(S) : John T. HOOKS, Jr.

It is certified that error appears in the above-identified patent and that said Letters Patent is hereby corrected as shown below:

On the title page:
Block [54], after "STORAGE" insert --,--.

Column 10, line 14, change "o" to --to--;

Column 10, line 42, change "t" to --to--.

Signed and Sealed this

Eighth Day of December, 1992

Attest:

DOUGLAS B. COMER

*Attesting Officer*   *Acting Commissioner of Patents and Trademarks*